United States Patent [19]
Cambria

[11] 3,941,008
[45] Mar. 2, 1976

[54] SHIFT MECHANISM FOR AUTOMATIC TRANSMISSION
[75] Inventor: Emanuel F. Cambria, Tannersville, Pa.
[73] Assignee: Hurst Performance, Inc., Warminster, Pa.
[22] Filed: July 1, 1974
[21] Appl. No.: 484,708

[52] U.S. Cl. .................. 74/473 R; 74/143; 74/475; 74/476
[51] Int. Cl.² .......................................... G05G 9/06
[58] Field of Search .......... 74/142, 143, 473 R, 475, 74/476

[56] References Cited
UNITED STATES PATENTS
| | | | |
|---|---|---|---|
| 3,665,775 | 5/1972 | Freeman | 74/473 R |
| 3,800,614 | 4/1974 | Johnson | 74/473 R |

FOREIGN PATENTS OR APPLICATIONS
| | | | |
|---|---|---|---|
| 1,189,866 | 3/1965 | Germany | 74/473 R |
| 1,159,774 | 12/1963 | Germany | 74/473 R |

*Primary Examiner*—Allan D. Herrmann
*Attorney, Agent, or Firm*—Coffee and Sweeney

[57] ABSTRACT

An in-line shift mechanism for an automotive automatic transmission having the dual capability of permitting selective shifting directly into any one of plural drive positions, a neutral position, a reverse position or a park position, and also of only sequential shifting through the three drive positions in either direction while requiring momentary release of the shifting lever between adjacent drive positions. The shift lever is pivotally mounted for forward and rearward movement as well as perpendicular (usually generally vertical) movement relative to the pivot axis of the lever. A cam surface is provided on the mounting bracket for engagement with a pin carried by the shift lever to require vertical displacement of the shift lever to move from park position into reverse position and another vertical displacement to move from reverse position to any of the three drive positions or neutral. A pawl and detent plate are mounted respectively on the shift lever and the mounting bracket to require successive shifting through the three drive positions while the shift lever is in its lowermost vertical position.

15 Claims, 10 Drawing Figures

SHIFT MECHANISM FOR AUTOMATIC TRANSMISSION

BACKGROUND AND SUMMARY OF THE INVENTION

The present invention relates to shifters for automatic transmissions and more particularly to a shifter for use with an automatic transmission to permit rapid, "slap-shifting" of the automatic transmission into increasing speed ranges while preventing inadvertent skipping of adjacent drive positions.

At present, shifters are available to prevent inadvertent overshifting or undershifting of the transmission into undesired speed ranges for example, during drag racing. Such inadvertent improper shifting is to be avoided because of the possibility of damaging the transmission and the probability of losing speed or power during a race. Although these shifters may operate satisfactorily, none are of such simple and rugged construction as to be capable of being manufactured at low cost while also permitting use in the customary manner for street driving.

It is the object of the present invention to provide a shifter for an automobile automatic transmission which is capable of shifting in the customary manner while also being capable of requiring sequential shifting to prevent inadvertent overshifting or undershifting.

The present invention generally comprises a shift lever mounted on a frame for pivotal movement between three forward drive positions, neutral, reverse and park positions, and for upward movement relative to the axis of said pivoting movement. The shift mechanism includes a shifter plate mounted on the frame for pivotal movement about the axis of said shift lever and which has a motion transmitting connection to the automatic transmission. Means is provided on the shift lever for pivoting the shifter plate and a self-centering pawl and detent means is actuated by the shift lever and is pivotable about the same axis. While the shift lever is in a lowermost vertical position the pawl and detent means is adapted to permit successive shifting of the shift lever between the three forward drive positions only after momentary release of the shift lever between adjacent drive positions.

DESCRIPTION OF THE PREFERRED EMBODIMENT

Figures 1, 2:
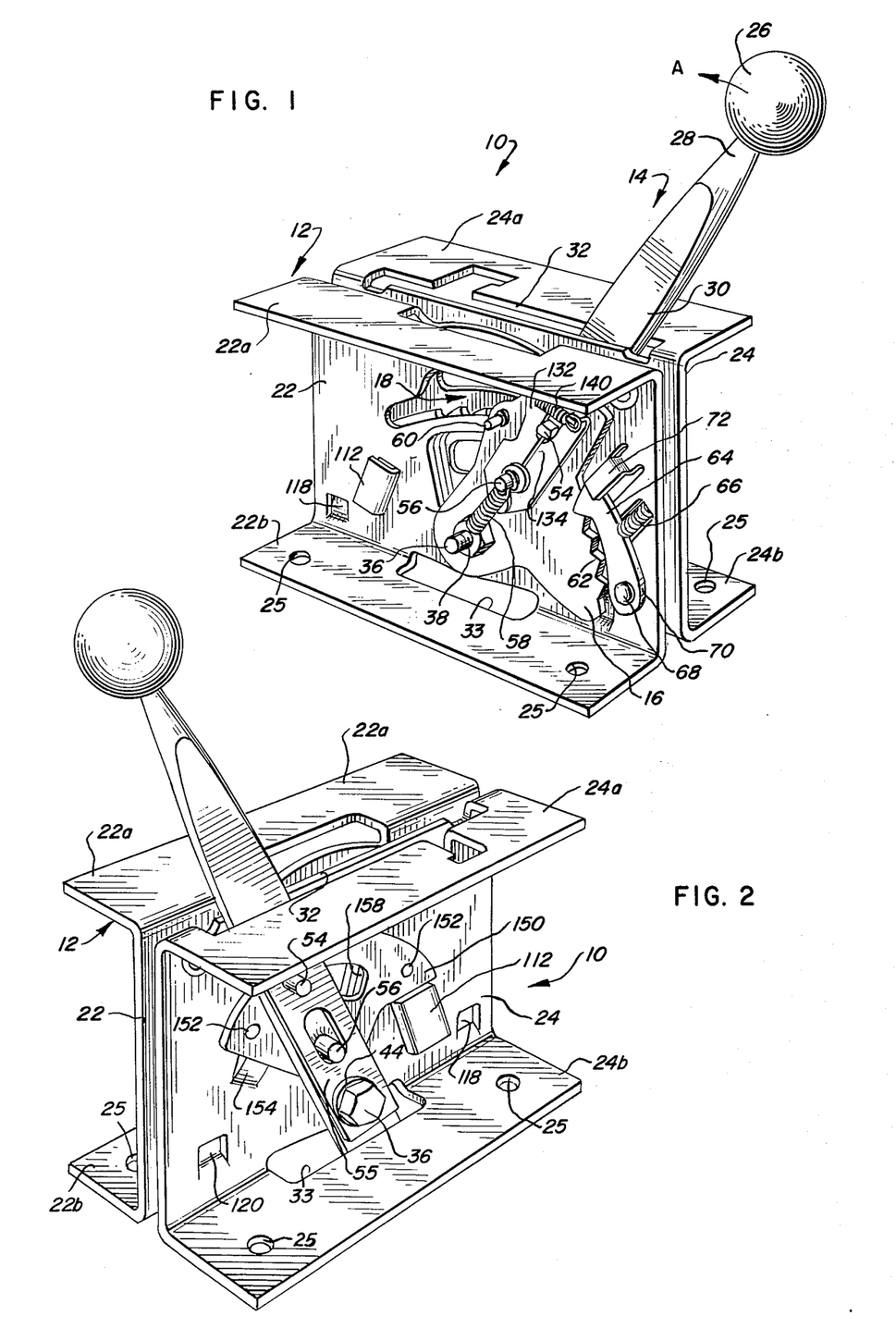
FIG. 1 is a perspective view of the shift mechanism of the present invention showing generally the elements exposed on one side of the mounting bracket.
FIG. 2 is another perspective view of the shift mechanism showing generally the exposed elements on the other side of the mounting bracket.
Figure 3:
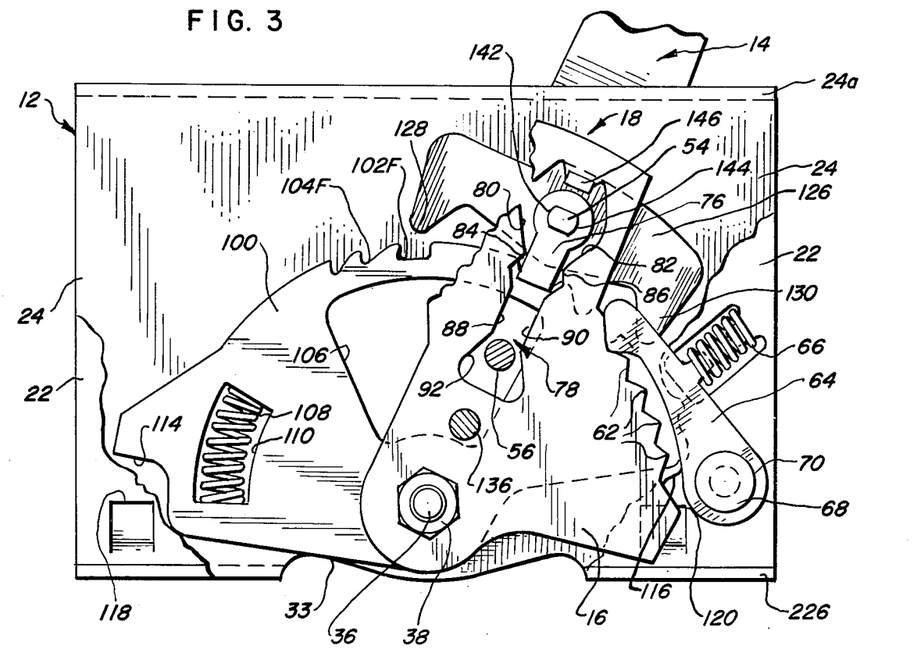
FIG. 3 is a fragmented elevational view looking at the side of the shifting mechanism shown in FIG. 1 and showing the shift lever in an unbiased position, in first gear.
Figure 4:
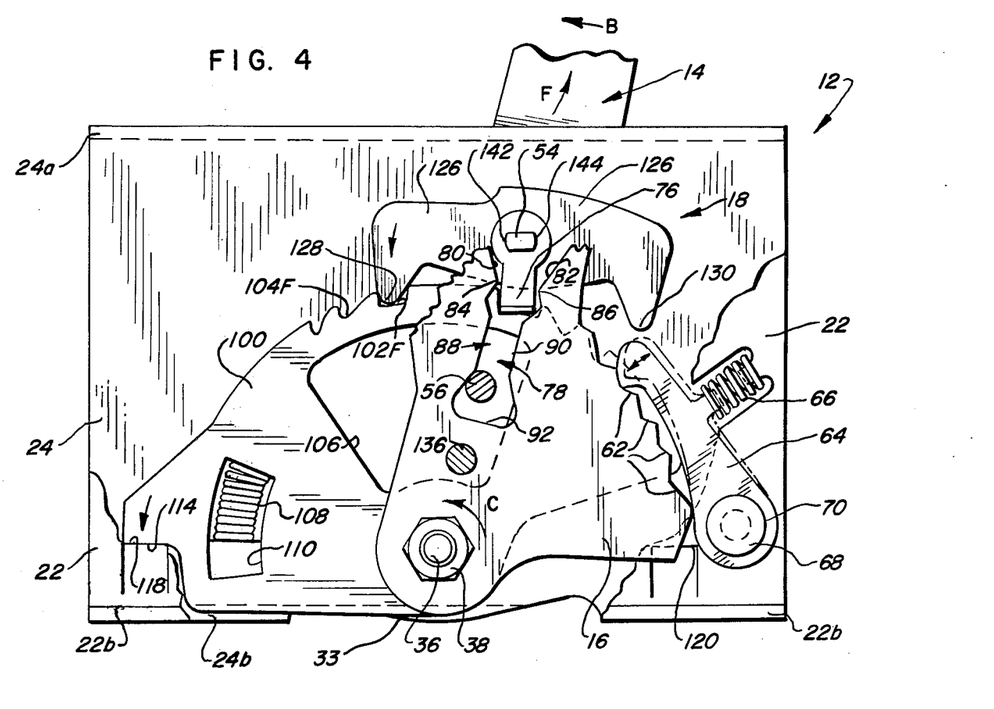
FIG. 4 is an elevational view similar to FIG. 3 showing the shift lever being moved from first to second gear.
Figure 5:
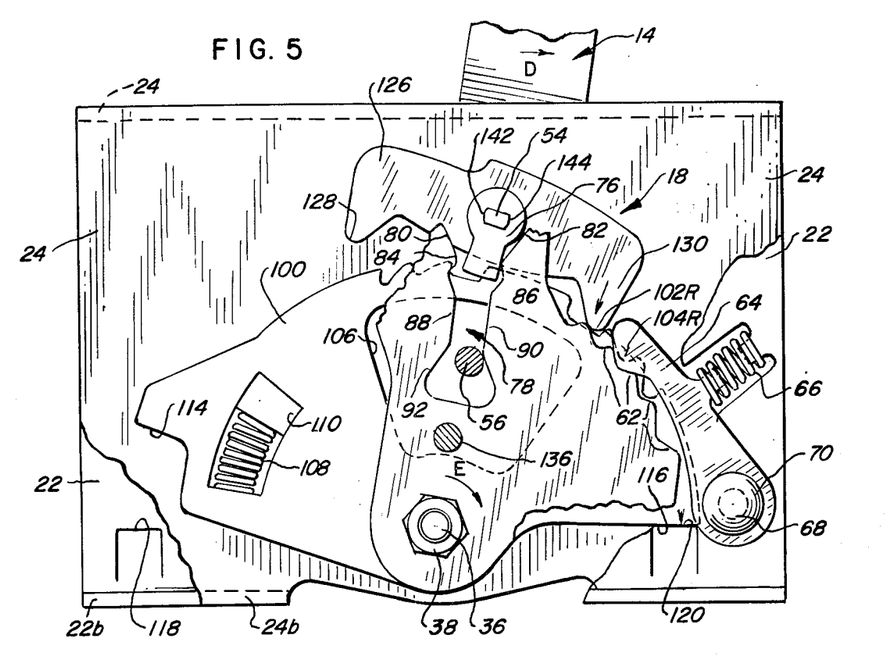
FIG. 5 is another elevational view similar to FIG. 3 showing the shift lever being moved from third gear into second gear.

Referring now to the drawings, there is illustrated in FIGS. 1 and 2 the preferred embodiment of the in-line shift mechanism, generally designated 10, for use with a conventional automatic transmission. The shift mechanism 10 includes a mounting bracket, generally designated 12, a shift lever, generally designated 14, a shifter plate 16 and pivotal stop means, generally designated 18 as best seen in FIGS. 3 to 5. The shift mechanism 10 normally is located inside the passenger compartment of an automobile alongside or above the transmission housing, with the shift lever 14 in easy reach for the driver.

The bracket 12 includes two U-shaped channel members 22 and 24 which are fastened together in a spaced apart, back-to-back relationship as seen in FIGS. 1 and 2. The corresponding upper flanges 22a and 24a and lower flanges 22b and 24b may be used to mount the bracket as through holes 25 provided in the lower flanges. A plurality of arcuate slots 22c, 24c, 22d and 24d in the channel members 22 and 24 provide clearance openings for the stop means 18 mounted between the two channels 22 and 24, as will be described hereinafter.

The shift lever includes a ball or handle 26 on an upper, tapered cylindrical end 28 of the shift lever 14. The lower end 30 of the shift lever is substantially flat and fits through a slot 32 in the upper flange 24a of channel 24. The lower flanges 22b and 24b of the bracket 12 are provided with openings 33 to provide clearance for the lower end 30 of the shift lever. The shift lever 14 is pivotally mounted to the bracket 12 by means of a bolt 36 and nut 38. The bolt 36 is provided with a sleeve 42 (FIG. 6) to prevent wearing of the threaded portion of the bolt against the shift lever 14. Two washers 44 and 46 also are provided on either end of the bolt 36. The shift lever 14 pivots about the horizontal axis provided for by the bolt and sleeve 36 and 42. As shown in FIG. 1, the shift lever 14 is illustrated in a position corresponding to the first gear of the transmission and pivotal movement of the shift lever in the direction of arrow A will shift the transmission through second gear, third gear, neutral position, reverse gear and into a park position.

Figure 6:
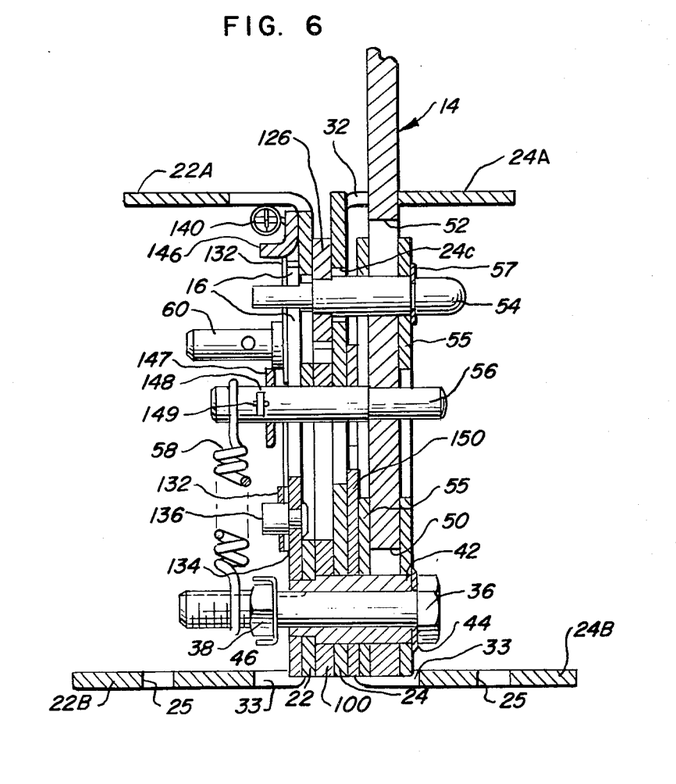
FIG. 6 is a vertical section taken generally along the line 6—6 of FIG. 10, generally through the axis of the shift lever.

Referring to FIG. 6, the shift lever 14 also is capable of generally vertical up and down movement. A slot 50 in the bottom end 30 of the shift lever and another slot 52 near the center portion of the shift lever allow the shift lever to be moved generally upwardly about the sleeve 42 and a drive pin 54. A pair of fastening plates 55 are secured by the bolt 36 and a spring washer 57 on the pin 54 to prevent the shift lever 14 from slipping in the horizontal plane. The drive pin 54 engages the stop means 18 as will be described hereinafter.

A biasing pin 56 is secured to the shift lever 14 and is biased by a spring 58 around the pin 56 and the bolt 36 to maintain the shift lever in its lowermost position as shown in FIGS. 1 and 6.

The shifter plate 16 is pivotally mounted on the left side of the mounting bracket 12 by the bolt 36. The shifter plate 16 includes a connection stud 60 for transmitting the motion of the shifter plate through a cable (not shown) to the transmission. The shifter plate 16 is provided with a plurality of saw tooth detents 62 in engagement with a cam 64 which is constantly spring biased by a spring 66 into engagement with the detents 62. The cam 64 is pivotally mounted on the bracket 12 by means of a pin 68 and washer 70. A flange 72 also is provided in the bracket 12 to guide the upper end of the cam 64. The cam 64 and the detent 62 hold the shifter plate 16 in one position until a force large enough to overcome the tension of spring 66 is applied to the shifter plate.

The drive pin 54, mentioned above, transmits the movement of the shift lever 14 to the shifter plate 16. More particularly, referring to FIG. 3, the drive pin 54 is seen to include a downwardly extending tab 76. The tab 76 and the pin 54 are fitted within an irregular slot 78 formed in the shifter plate 16. The drive pin 54, tab 76 and slot 78 provide a lost motion means for the shift mechanism as described below.

Figure 10:
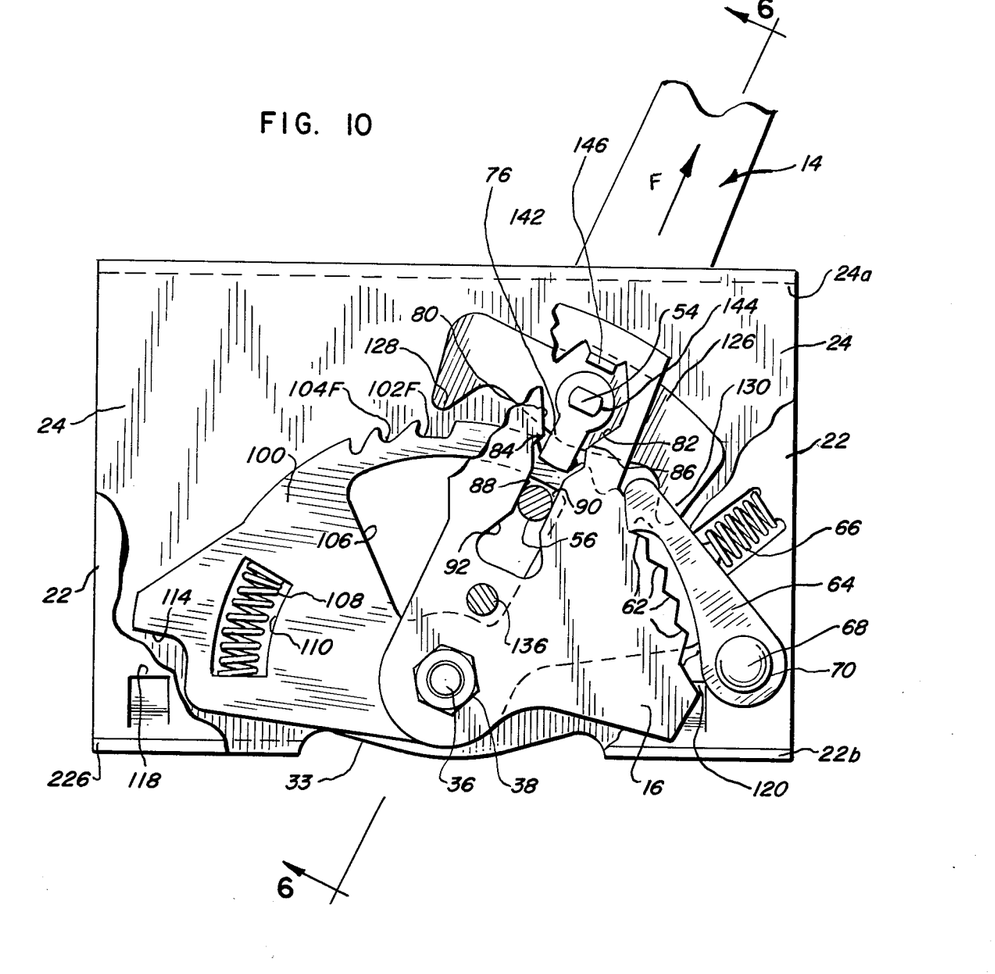
FIG. 10 is an elevational view similar to FIG. 3 showing the shift lever in the upward position for disengagement of the stop means.

The irregular slot 78 is provided in the shifter plate to allow for the two types of shifting modes, a conventional shifting mode wherein the transmission can be moved directly to any desired position, and a racing or slap-shifting mode where the shift mechanism 10 requires intermittent and sequential shifting through the three forward drive positions. The customary shifting pattern will be described in detail later, with reference to FIGS. 8 and 10, and the racing or slap-shifting operation will be described below.

The irregular slot 78, discussed above, includes two convergent cam surfaces 80 and 82 at its upper end. The convergent cam surfaces 80 and 82 terminate in a pair of pawl pivot cams 84 and 86. The pawl pivot cam surfaces 84 and 86 diverge slightly and again converge into two flat, slot surfaces 88 and 90 for use in the conventional shifting pattern. The bottom or end of the slot 78 is formed in a generally bell-shaped pattern 92.

The drive pin 54 will engage one of the drive pin cam surfaces 80 or 82 when the shift lever is pivoted about the sleeve 42. More particularly, referring to FIG. 4, as the shift lever is pivoted in the direction of arrow B, the drive pin 54 engages the cam surface 80 and causes the shifter plate to rotate in the direction of arrow C with the shift lever 14. The stud 60 on the shifter plate 16 will then transmit the above motion through a cable to shift the transmission.

The stop means 18 operates simultaneously with the shifting of the shifter plate 16 to prevent overshifting or undershifting. More particularly, referring to FIG. 3, the stop means includes a detent plate 100 which is pivotally mounted on the sleeve 42 between the mounting bracket portions 22 and 24. The detent plate is generally symmetrical about the axis of the bolt 36. The detent plate 100 has a first pair of detents 102F and 104F on the forward side of an axis constructed generally along the center line of the shift lever 14. A second pair of detents 102R and 104R is provided on the detent plate 100 rearwardly of the axis. An arcuate segment or hole 106 is provided approximately in the center of the detent plate 100 to provide clearance for the biasing pin 56. Biasing means in the form of a spring 108 is provided in an arcuate slot 110 near the left-hand portion of the detent plate 100 as seen in FIGS. 3 through 5. The spring 108 is secured within the channel members 22 and 24 of the mounting bracket 12 by a pair of outwardly formed flanges 112 thereon. The spring 108 constantly urges the detent plate toward its center position as seen in FIG. 3.

Two stop surfaces 114 and 116 are provided on either end of the detent plate 100 for engagement with flanges 118 and 120 formed inwardly of the base portions of the channels 22 and 24. Thus, in FIG. 3, the detent plate 100 can rotate in a counterclockwise direction until the stop surface 114 engages the flange 118 as seen in FIG. 4 and similarly in a clockwise direction until the stop surface 116 engages the flange 120 as seen in FIG. 5.

A double-ended pawl member 126 is secured to the drive pin 54 directly above the detent plate 100, having a pawl 128 on the forward side of the pin and another pawl 130 on the rearward side of the pin. Sequential shifting is required through the first three forward drive positions when the shift lever is in its lowermost position as will be explained with reference to FIG. 4.

Figure 7:
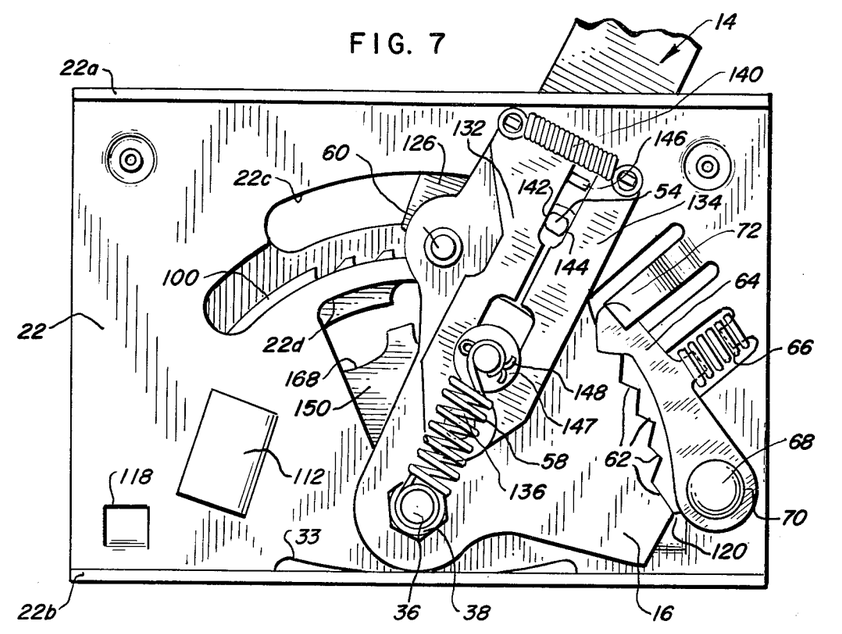
FIG. 7 is an elevational view similar to FIG. 3 showing the spring biased, self-centering arms for the drive pin.

FIG. 4 shows the shift lever being moved in the direction of arrow B. As the shift lever rotates about the sleeve 42 (i.e., bolt 36), the tab 76 of the pin 54 will engage the pawl pivot cam surface 84 which causes the pawl 128 to first rotate counterclockwise and engage the detent 102F and second to rotate the detent plate 100 against the force of the biasing spring 108 simultaneously as the drive pin 54 rotates the shifter plate 16. As the stop surface 114 engages the flange 118 the detent plate 100 will stop rotating and also prevent the shift lever 14 from rotating by means of the pawl 128 in engagement with the detent plate 100. Thus, it is possible only to shift the transmission from a first gear to an intermediate, second gear since the stop means 18 prevents further rotation of the shift lever. The shift lever 14 must then be released to relieve the pressure which holds the pawl 128 in engagement with the detent 102F. Referring to FIG. 7, a pair of centering arms 132 and 134 are seen being pivotally mounted to the shifter plate 16 by a rivet 136. The centering arms are biased by a spring 140 toward one another, into engagement with a pair of smaller curved surfaces 142 and 144, respectively, provided on the end of the drive pin 54. The travel of the centering arms 132 and 134 toward one another is limited by engagement with a tab 146 formed on the shifter plate 16 above the slot 78. The centering arms 132 and 134 are engaged by a washer 147 which is secured to the biasing pin 56 by a cotter pin 148 through a hole 149 therein to prevent the centering arms 132 and 134 from slipping off of the rivet 136. As the shift lever 14 is released, the centering arm 132, under the biasing force of the spring 140, will move the drive pin 54 and thus the shift lever 14 slightly rearwardly in a direction opposite that of arrow B and therefore recenter the pawls 128 and 130 to the position as shown in FIG. 3. Now the transmission will be in the second or intermediate gear and the shifting mechanism will be properly oriented for shifting into third gear or for downshifting back into first gear.

The operation for shifting into third gear is substantially the same as above described except that the pawl 128 will engage the detent 104F and allow the shift plate 116 to continue to rotate in the same direction to shift the transmission into third gear.

FIG. 5 shows the transmission being downshifted by the shifting means 10 from third gear to second gear.

This operation is substantially the same as the upshifting pattern except that the detents 102R and 104R on the opposite side of the shifter plate 100 are used in conjunction with the pawl 130. In this operation the shift lever is pivoted in the direction of arrow D (FIG. 5) and the tab 76 of the drive pin 54 engages the pawl pivot cam surface 86 to rotate the pawl 130 into engagement with the detent 102R. With continued rotation of the shift lever the drive pin 54 engages the cam surface 82 and causes the shifter plate to rotate in the direction of arrow E for downshifting of the transmission from third gear to second gear. As the detent plate 100 continues to rotate, the stop surface 116 abuts the flange 120 and prevents further rotation of the detent plate 100 and the shift lever 14 through the pawl 130. The shift lever cannot be rotated until it is released to allow the pawl 130 to disengage the detent 102R. Again, referring to FIG. 7, when the shift lever 14 is released, the centering arm 134 engages the curved surface 144 of the drive pin, and, under the force of the centering spring 140, causes the shift lever to move slightly forward in a direction opposite that of arrow D and also causes recentering of the pawl member 126 to its position as shown in FIG. 3.

The stop means 18 as described is operative only during upshifting to second gear and third gear and downshifting to second gear and first gear.

The remainder of the shifting pattern into neutral, reverse and park position as well as the conventional shifting method is controlled by a cam plate 150 which is mounted on the side of the support bracket as seen in FIG. 2 and the biasing pin 56. The cam plate 150 is riveted to the bracket 12 by a pair of rivets 152 in engagement with the spring flange support 112 near the front portion of the bracket 12 and another flange 154 formed near the rear portion of the bracket 12. As described earlier, the pin 56 is securely fastened to the shift lever 14 and extends through the detent plate 100, the shifter plate 16 and the centering arms 132 and 134 to engage the spring 58. A portion of the pin 56 is normally in engagement with the cam surface 158 of the cam plate 150.

Figure 8:
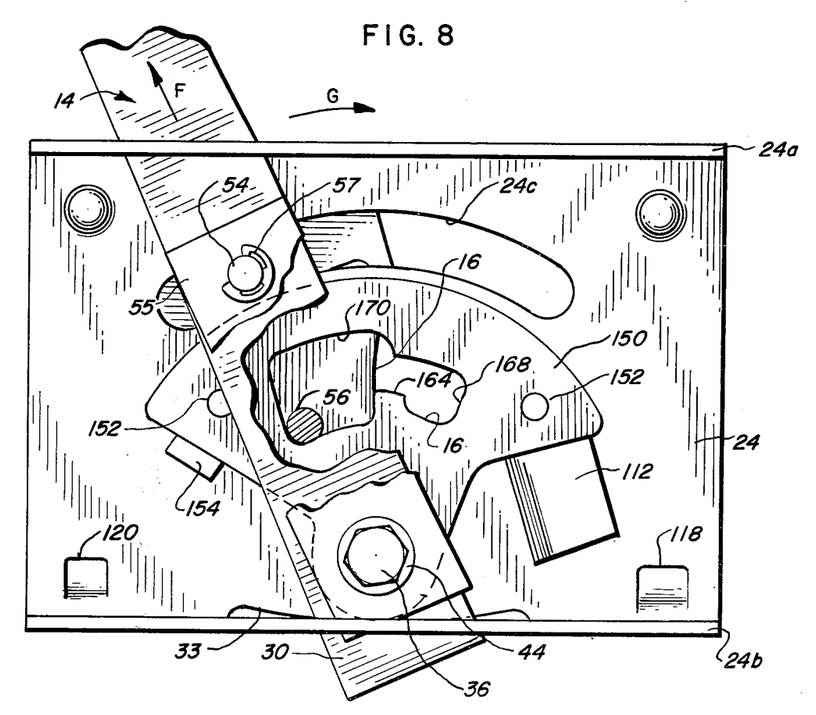
FIG. 8 is a fragmentary elevational view looking at the side of the shifting mechanism shown in FIG. 2.
Figure 9:
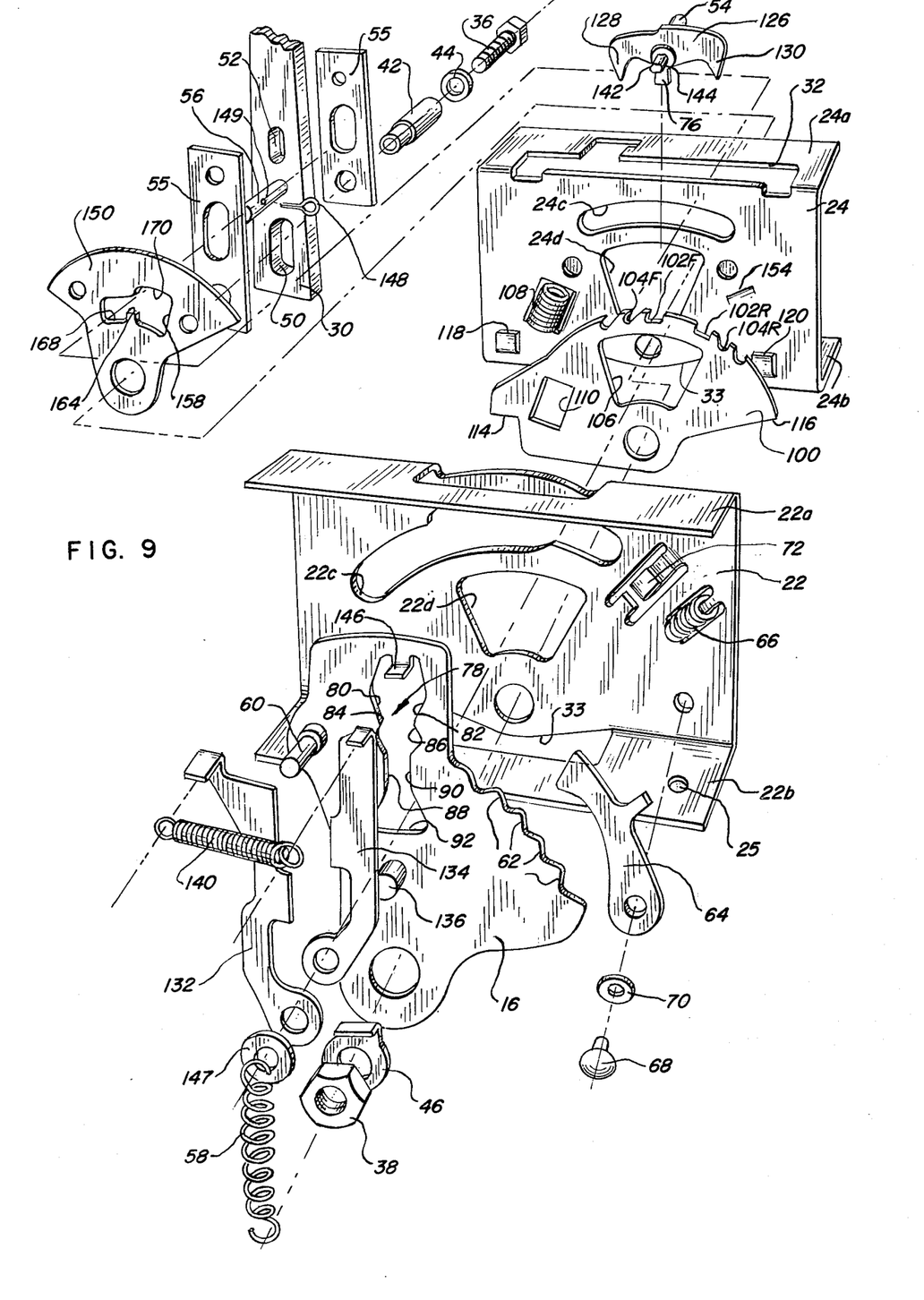
FIG. 9 is an exploded, perspective view showing the components of the invention before assembly.

Referring to FIG. 8, the pin 56 is shown in engagement with the lowermost portion of the cam surface 158 when the shift lever 14 is in first, second or third gear positions. The shift lever must then be moved upwardly in the direction of arrow F to an intermediate level 164 of the cam plate 150. When the shift lever 14 is in a directly vertical position, the transmission will be in the neutral position as can be seen in FIG. 8. As the shift lever is moved slightly forward (one detent 62 in the shifter plate 16) in the direction of arrow G, the pin 56 will remain at the same level in the position corresponding to the reverse position of the transmission. The shift lever may then be moved forward again in the direction of arrow G to the park position provided by the notch 168. The shift lever, when the transmission is in the park position will be at the same vertical height as when in any of the drive positions.

Referring to FIG. 8, to avoid locking of the shift lever 14 during the drive positions, the cam 150 provides an upper cam surface 170 for engagement with the pin 56. As the shift lever 14 is lifted vertically in the direction of arrow F the pin 56 will engage the upper surface of the cam 170 and permit free movement through the drive positions and into neutral by disengaging the stop means 18. In particular, referring to FIG. 10, as the shift lever 14 is moved upwardly in the direction of arrow F, the biasing pin is moved upwardly into engagement with the flat surfaces 88 and 90 of the shifter plate. Then, when the shift lever is pivoted about the sleeve 42 the pin 56 will drive the shifter plate 16 into the appropriate position for the transmission associated with the shifter position. During movement of the shift lever while in this upward position, the pawl member 126 will not pivot and the pawls 128 and 130 will not engage the detents 102F, 104F or 102R, 104R because the pin 56 is in engagement with the flat surfaces 88 90 of the shifter plate 16. Thus, to move directly into third gear from first gear, the driver simply lifts the shift lever 14 and moves it forward into the third position. The shift lever 14 will then be automatically biased downward again by the spring 58 to require sequential shifting in the downward direction. This, however, may similarly be avoided by again lifting and shifting the shift lever 14.

Therefore, as described, the new shift mechanism disclosed, provides for sequential shifting through the first three drive positions as desired under drag racing or other racing situations and also provides for customary shifting when the same automobile is used for street driving.

It also is contemplated by this invention that the shifting order of the forward drive positions may be reversed. Instead of shifting through first, second and third gear while the shift lever is rotated in a counterclockwise direction as shown in FIG. 4, alterations of the transmission can make it possible so that the shift mechanism disclosed can shift sequentially through first, second and third gears while rotating the shift lever in a clockwise direction as shown in FIG. 4. No alterations of the shift mechanism are required for this type of conversion.

The foregoing detailed description has been given for clearness of understanding only and no unnecessary limitations should be understood therefrom as some modifications will be obvious to those skilled in the art.

I claim:

1. An in-line shaft mechanism for a vehicle automatic transmission having at least three forward drive positions, comprising:
    a support bracket;
    a shift lever pivotally mounted on said support bracket;
    a shifter plate pivotally mounted on the support bracket, with a motion transmitting connection means to said transmission; and
    stop means associated with said shift lever to permit successive pivoting of said shift lever in progressive increments between at least some adjacent shift lever positions only after momentary release of said shift lever after each shifting movement.

2. An inline shift mechanism for a vehicle automatic transmission having at least three forward drive positions, comprising:
    a support bracket;
    a shift lever pivotally mounted on said support bracket;
    a shifter plate pivotally mounted on the support bracket, with a motion transmitting connection means to said transmission; and
    stop means including a self-centering pawl secured to the shift lever and a detent plate mounted on the bracket for engagement with said pawl to permit successive pivoting of said shift lever in progressive increments between adjacent drive positions only after momentary release of said shift lever after each shifting movement.

3. The shift mechanism of claim 2 wherein the detent plate is pivotally mounted on the bracket and is biased toward a centered position between two stop positions.

4. The shift mechanism of claim 3 including lost motion means associated with the shift lever and adapted to engage said pawl with said detent plate to move said detent plate into one of said stop positions as the shifter plate is pivoted to an adjacent position by said shift lever.

5. The shift mechanism of claim 3 including lost motion means between the shift lever and detent plate to permit the detent plate to recenter itself after release of said shift lever whereby said lever can be moved into an adjacent drive position.

6. The shift mechanism of claim 5 wherein the lost motion means includes a pair of spring biased centering arms mounted on the shifter plate in engagement with means on said shift lever to constantly urge the pawl out of engagement with the detent plate.

7. The shift mechanism of claim 6 wherein the shifter plate includes a generally vertical slot having two opposed cam surfaces near the upper end thereof, and said means on said shift lever is engageable with said cam surfaces to cause the pawl to pivot into engagement with said detent plate before said shift lever engages said shifter plate.

8. A shift mechanism for an automotive automatic transmission, comprising:
a mounting bracket;
a shift lever mounted on the bracket for both forward and rearward pivotal movement between at least three forward drive positions, neutral, reverse and park positions and for generally transverse movement relative to the axis of said pivoting movement;
a shifter plate mounted on the bracket for pivotal movement about said axis, said shifter plate having a motion transmitting connection to an automatic transmission;
a drive pin on said shift lever for pivoting said shifter plate;
stop means comprising a self-centering pawl carried by the shift lever and a detent plate mounted on the bracket pivotable about said axis; and
said stop means being adapted to permit successive shifting of said shift lever in progressive increments between said three drive positions only after momentary relief of said lever after each shifting movement between adjacent drive positions.

9. The shift mechanism of claim 8 including lost motion means associated with the drive pin adapted to engage said pawl with said detent plate to move said detent plate into one of said stop positions as the shifter plate is pivoted to an adjacent position by said drive pin.

10. The shift mechanism of claim 8 including lost motion means between the drive pin and detent plate to permit the detent plate to recenter itself after release of said shifting lever whereby said lever can be moved into an adjacent drive position.

11. The shift mechanism of claim 10 wherein the lost motion means includes a pair of spring biased centering arms mounted on the shifter plate in engagement with said drive pin to constantly urge the pawl out of engagement with the detent plate.

12. The shift mechanism of claim 11 wherein the shifter plate includes a generally vertical slot having two opposed cam surfaces near the upper end thereof, and the drive pin includes a depending tab for engagement with said cam surfaces to cause the pawl to pivot into engagement with said detent plate before said drive pin engages said shifting plate.

13. A shift mechanism for an automotive automatic transmission, comprising:
a vertically disposed mounting bracket;
a shift lever mounted on said mounting bracket with horizontally disposed pivot pin means for pivoting movement relative thereto and for generally vertical movement relative thereto;
means biasing said shift lever into a lowermost position;
a shifter plate pivotally mounted on said pivot pin means and having a motion transmitting connection to an automatic transmission;
a drive pin mounted on said shift lever and extending through a generally vertically disposed slot in said shifter plate;
a biasing pin secured to said shift lever, said pin being biased to hold the shift lever in a lowermost vertical position;
a generally arcuate cam slot associated with said mounting bracket within which said biasing pin is movable, said cam slot having a formation requiring upward movement of said shift lever in order to pivot the same from any one of three forward drive positions into neutral, reverse or park positions;
a detent plate pivotally mounted on said pivot pin means and biased into a centered position between two stop positions; and
pawl means carried by said shift lever and adapted, during shifting movement of said shift lever between any adjacent two of said drive positions, to pivot said detent plate into one of said stop positions as said shifter plate is pivoted to the next drive position by said drive pin, and to release said shift lever to permit said detent plate to recenter itself thereby permitting shifting of the shift lever into the next drive position.

14. The shift mechanism of claim 13 wherein said pawl means comprises a portion of lost motion means which includes a pair of spring biased centering arms mounted on the shifter plate in engagement with said drive pin to constantly urge the pawl out of engagement with the detent plate.

15. The shift mechanism of claim 14 wherein the vertical slot of the shifter plate includes two opposed cam surfaces near the upper end thereof, and the drive pin includes a depending cam for engagement with one of said cam surfaces to cause the pawl to pivot into engagement with said detent plate before said drive pin engages said shifting plate.

\* \* \* \* \*